(12) United States Patent
Kim et al.

(10) Patent No.: US 8,342,747 B2
(45) Date of Patent: Jan. 1, 2013

(54) TEMPERATURE SENSING CIRCUIT OF SEMICONDUCTOR DEVICE

(75) Inventors: Si-Hong Kim, Gunpo-si (KR);
Kwang-Il Park, Yongin-si (KR);
Hyun-Joong Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 486 days.

(21) Appl. No.: 12/694,624

(22) Filed: Jan. 27, 2010

(65) Prior Publication Data

US 2010/0189160 A1    Jul. 29, 2010

(51) Int. Cl.
*G01K 7/14* (2006.01)

(52) U.S. Cl. .................. 374/170; 374/171

(58) Field of Classification Search .......... 374/170–172, 374/178, 183, 185
See application file for complete search history.

(56) References Cited

U.S. PATENT DOCUMENTS

| | | | |
|---|---|---|---|
| 5,388,134 A * | 2/1995 | Douglass et al. ............. | 374/170 |
| 5,544,120 A | 8/1996 | Kuwagata et al. | |
| 5,771,180 A * | 6/1998 | Culbert ......................... | 702/130 |
| 6,502,161 B1 | 12/2002 | Perego et al. | |
| 6,515,922 B1 | 2/2003 | Yamagata | |
| 6,747,474 B2 | 6/2004 | Borkar et al. | |
| 6,853,259 B2 * | 2/2005 | Norman et al. .............. | 374/170 |
| 7,107,178 B2 * | 9/2006 | Won et al. ..................... | 702/130 |
| 7,167,404 B2 | 1/2007 | Pathak et al. | |
| 7,173,840 B2 | 2/2007 | Krause et al. | |
| 7,272,757 B2 | 9/2007 | Stocken | |
| 7,331,708 B2 * | 2/2008 | Blom et al. ................... | 374/171 |
| 7,581,881 B2 | 9/2009 | Kim et al. | |
| 7,693,678 B2 * | 4/2010 | Cheng et al. ................. | 702/130 |
| 7,891,868 B2 * | 2/2011 | Sohn ............................. | 374/170 |
| 2004/0073394 A1 * | 4/2004 | Lee et al. ....................... | 702/99 |
| 2005/0141589 A1 * | 6/2005 | Kwon et al. .................. | 374/117 |
| 2006/0029122 A1 * | 2/2006 | Bowden et al. .............. | 374/170 |
| 2007/0160113 A1 * | 7/2007 | Kim et al. ..................... | 374/178 |
| 2008/0091378 A1 * | 4/2008 | Jeong et al. .................. | 702/130 |
| 2008/0136453 A1 * | 6/2008 | Kuo et al. ..................... | 374/170 |
| 2008/0238563 A1 * | 10/2008 | Kim et al. ..................... | 374/170 |
| 2008/0259997 A1 * | 10/2008 | Gardner et al. .............. | 374/170 |
| 2009/0129438 A1 * | 5/2009 | Pan ................................ | 374/170 |
| 2010/0141329 A1 * | 6/2010 | Kim ............................... | 374/170 |
| 2010/0189160 A1 * | 7/2010 | Kim et al. ..................... | 374/170 |
| 2012/0010839 A1 * | 1/2012 | McCarthy et al. ........... | 702/99 |

(Continued)

FOREIGN PATENT DOCUMENTS

JP        06295584 A    10/1994

(Continued)

*Primary Examiner* — Yaritza Guadalupe-McCall
(74) *Attorney, Agent, or Firm* — Volentine & Whitt, PLLC

(57) ABSTRACT

A temperature sensing circuit of a semiconductor device includes a code signal generator, a comparator, a reference clock generator and a final temperature code signal generator. The code signal generator is configured to output a first count signal having an increase rate that varies according to a change in temperature. The comparator is configured to receive the first count signal and a control signal, compare the first count signal with the control signal and output a comparison signal. The reference clock generator is configured to generate a reference clock having a uniform period regardless of the change in temperature during an activation period of the comparison signal. The final temperature code signal generator is configured to count pulses of the reference clock, generate a second count signal, modify the second count signal using an offset value, and output the modified second count signal as a final temperature code signal.

9 Claims, 10 Drawing Sheets

U.S. PATENT DOCUMENTS

2012/0161741 A1 * 6/2012 Zambetti ............... 374/170

FOREIGN PATENT DOCUMENTS

| | | | |
|---|---|---|---|
| JP | 2001210095 A | 8/2001 | |
| JP | 2007187659 A | 7/2007 | |
| KR | 0131176 B1 | 4/1998 | |
| KR | 1020030075160 A | 9/2003 | |
| KR | 1020050066205 A | 6/2005 | |
| KR | 1020070074938 A | 7/2007 | |

* cited by examiner ular design or specification. When the range of temperature codes output from the temperature sensing circuit is larger or smaller than the range of temperature codes required for the specification, the characteristics of a semiconductor device cannot be optimized. Thus, to adjust the variation range of temperature code values according to the variation range of target temperature code values required by the specification, a predetermined temperature code modification operation is needed.

TEMPERATURE SENSING CIRCUIT OF SEMICONDUCTOR DEVICE

CROSS-REFERENCE TO RELATED APPLICATIONS

A claim of priority under 35 U.S.C. §119 is made to Korean Patent Application No. 10-2009-0007059, filed on Jan. 29, 2009, the subject matter of which is hereby incorporated by reference.

BACKGROUND

The present disclosure relates to a semiconductor device, and more particularly, to a temperature sensing circuit of a semiconductor device capable of modifying a temperature code to adjust a variation range of temperature code values measured by a temperature sensor according to a variation range of target temperature code values.

In semiconductor devices requiring refresh operations, such as a dynamic random-access memory (DRAM), leakage current generally increases with increases in temperature. The increased leakage current results in deterioration of maintaining data and reduction in data retention time.

Accordingly, DRAMs, for example, must refresh data stored in memory cells by themselves to continuously maintain the data of the memory cell. The refresh period may be changed in accordance with the temperature to reduce power consumption of the DRAM.

More specifically, the power consumption may be reduced by lengthening the refresh period in a low-temperature region among multiple temperature regions, and data loss may be prevented by shortening the refresh period in a high-temperature region. A temperature sensing circuit is therefore needed for sensing the internal temperature of the DRAM. In general, a temperature sensing circuit generates a 1-bit signal indicating whether a sensed temperature is higher or lower than a specific temperature, and a temperature code signal based on a digital result value proportional to the sensed temperature.

However, when the range of temperature codes output from a temperature sensing circuit does not correspond to the range of temperature codes required by a particular design or specification, for example, when the range of temperature codes output from the temperature sensing circuit is larger or smaller than the range of temperature codes required for the specification, the characteristics of a semiconductor device cannot be optimized. Thus, to adjust the variation range of temperature code values according to the variation range of target temperature code values required by the specification, a predetermined temperature code modification operation is needed.

SUMMARY

Exemplary embodiments provide a temperature sensing circuit of a semiconductor device, such as a semiconductor memory, that adjusts a variation range of measured temperature code values according to a variation range of target temperature code values by adjusting the slope and/or y-intercept of a straight temperature code characteristic line in a digital method.

Exemplary embodiments are directed to a temperature sensing circuit of a semiconductor device. The temperature sensing circuit of the semiconductor device includes a code signal generator, a comparator, a reference clock generator and a final temperature code signal generator. The code signal generator is configured to output a first count signal having an increase rate that varies according to a change in temperature. The comparator is configured to receive the first count signal and a control signal, compare the first count signal with the control signal and output a comparison signal. The reference clock generator is configured to generate a reference clock having a uniform period regardless of the change in temperature during an activation period of the comparison signal. The final temperature code signal generator is configured to count pulses of the reference clock, generate a second count signal, modify the second count signal using an offset value, and output the modified second count signal as a final temperature code signal.

In exemplary embodiments, the code signal generator may include a first bias unit, a first ring oscillator and a first counter. The first bias unit is configured to output first and second bias signals having voltage levels that vary according to the change in temperature. The first ring oscillator is configured to output a first clock having a variable period in response to the first and second bias signals. The first counter is configured to count pulses of the first clock and output the first count signal.

In exemplary embodiments, the reference clock generator may include a second bias unit and a second ring oscillator. The second bias unit is configured to output third and fourth bias signals having uniform voltage levels regardless of the change in temperature. The second ring oscillator is configured to generate and output the reference clock in response to the third and fourth bias signals in the activation period of the comparison signal.

In exemplary embodiments, the final temperature code signal generator may include a second counter configured to count the pulses of the reference clock, generate the second count signal, and output the second count signal as the final temperature code signal. Here, the offset value may be intended to move the variation range of the final temperature code signal.

In exemplary embodiments, the final temperature code signal generator may include a third counter and an adder. The third counter is configured to count the pulses of the reference clock and output the second count signal for adjusting a variation of a value of the final temperature code signal with respect to the change in temperature according to a variation of a target temperature code value with respect to the change in temperature. The adder is configured to receive the second count signal, add or subtract the offset value to or from a value of the second count signal, and output the final temperature code signal. Here, the offset value may be intended to move the variation range of the modified final temperature code signal to the variation range of the target temperature code value.

In exemplary embodiments, the pulses of the reference clock may be counted until a value of the first count signal becomes the same as a value of the control signal to adjust the activation period of the comparison signal, change a value of the second count signal, and adjust a slope of a straight characteristic line of the final temperature code signal.

In exemplary embodiments, when a value of the first count signal is less than a value of the control signal, the comparison signal may be activated to keep the reference clock oscillating in the activation period of the comparison signal and increase a value of the second count signal. When the value of the first count signal becomes the same as the value of the control signal, the comparison signal may be inactivated to stop the reference clock from oscillating, and the offset value is added or subtracted to or from the second count signal to output the modified second count signal as the final temperature code signal.

In exemplary embodiments, the control signal may be set to an increased value to increase a variation of a value of the final temperature code signal with respect to the change in temperature when the variation of the value of the final temperature code signal with respect to the change in temperature is smaller than a variation of a target temperature code value with respect to the change in temperature. The control signal may be set to a reduced value to reduce the variation of the value of the final temperature code signal with respect to the change in temperature when the variation of the value of the final temperature code signal with respect to the change in temperature is larger than the variation of the target temperature code value with respect to the change in temperature.

In exemplary embodiments, the adder may move the variation range of the modified final temperature code signal to the variation range of the target temperature code value by adding or subtracting the offset value to or from the value of the second count signal. Here, the offset value may be set to a difference between a y-intercept of a straight characteristic line of the modified final temperature code signal and a y-intercept of a straight characteristic line of the target temperature code value.

BRIEF DESCRIPTION OF THE DRAWINGS

Illustrative embodiments of the inventive concept will be described in further detail with reference to the attached drawings, wherein like reference numerals refer to like parts throughout the various drawings unless otherwise specified. Various aspects of the drawings may have been exaggerated for clarity.

DETAILED DESCRIPTION OF THE EMBODIMENTS

Figure 1:
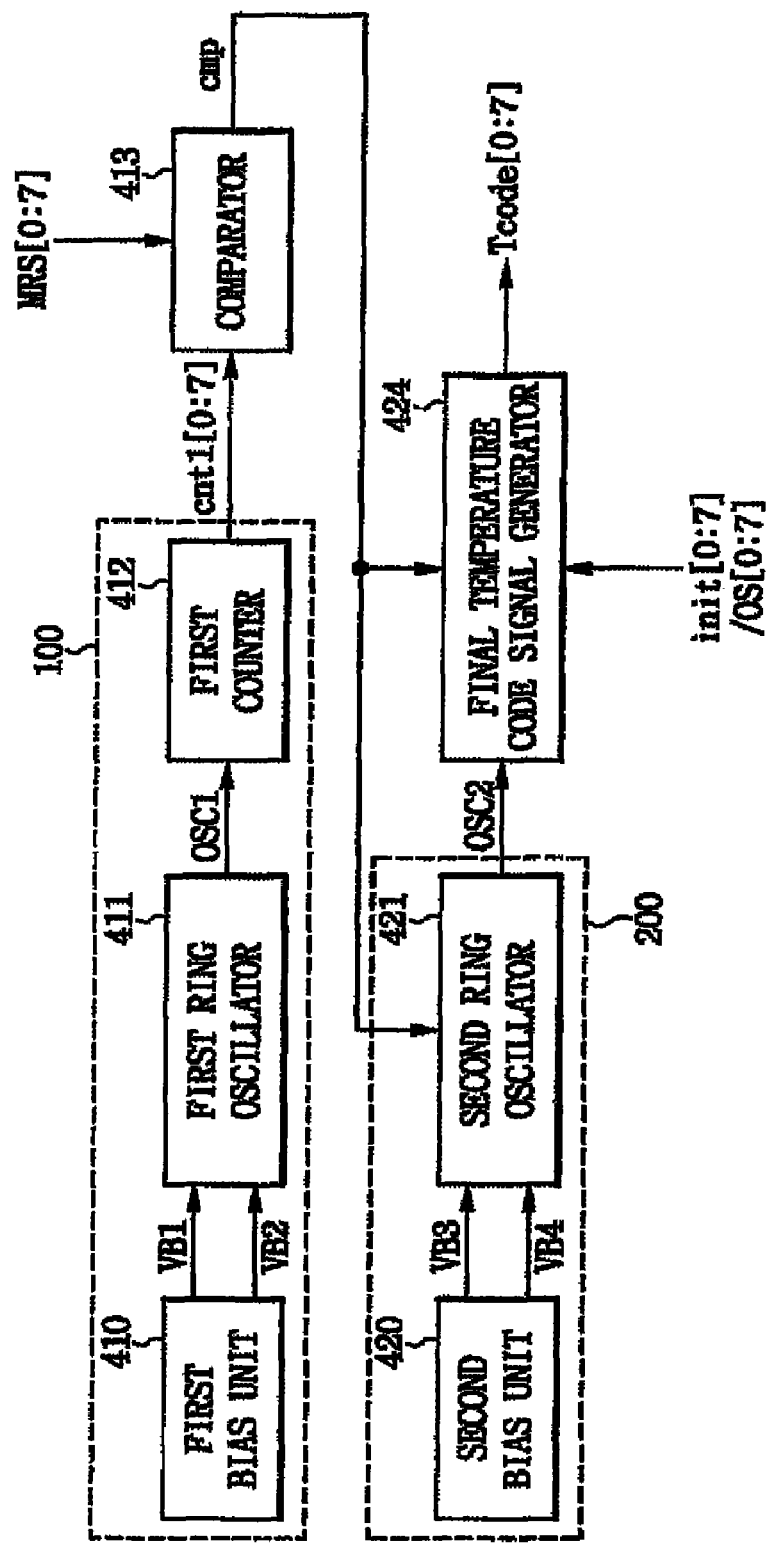
FIG. 1 is a block diagram of a temperature sensing circuit of a semiconductor device, according to exemplary embodiments.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments. In the drawings, the sizes and thicknesses of regions and components may be exaggerated for clarity.

A temperature sensing circuit of a semiconductor device according to exemplary embodiments will be described in detail with reference to the attached drawings. However, the inventive concept is not limited to exemplary embodiments described.

FIG. 1 is a block diagram of a temperature sensing circuit of a semiconductor device, according to exemplary embodiments. The temperature sensing circuit includes a code signal generator 100, a comparator 413, a reference clock generator 200, and a final temperature code signal generator 424. The code signal generator 100 includes a first bias unit 410, a first ring oscillator 411 and a first counter 412, and the reference clock generator 200 includes a second bias unit 420 and a second ring oscillator 421.

Functions of the respective blocks of the temperature sensing circuit of a semiconductor device, according to exemplary embodiments, are described below with reference to FIG. 1.

In the code signal generator 100, the first bias unit 410 outputs first and second bias signals VB1 and VB2, having voltage levels that vary according to changes in temperature. The first ring oscillator 411 outputs a first clock signal OSC1, having a variable period in response to the first and second bias signals VB1 and VB2. The first counter 412 counts pulses of the first clock signal OSC1 and outputs a first count signal cnt1. Because the period of the first clock signal OSC1 varies according to changes in temperature, the increase rate of the first count signal cnt1 also varies according to changes in temperature.

The comparator 413 compares the first count signal cnt1 with a mode register set signal MRS[0:7], and outputs a comparison signal cmp to adjust the variation range of values of a final temperature code signal Tcode[0:7] according to the variation range of target temperature code values, for example, required by specification.

In the reference clock generator 200, the second bias unit 420 outputs third and fourth bias signals VB3 and VB4, having uniform voltage levels regardless of changes in temperature. The second ring oscillator 421 outputs a reference clock signal OSC2, having a uniformly toggled period in response to the third and fourth, bias signals VB3 and VB4 during an activation period of the comparison signal cmp.

The y-intercept of a straight characteristic line of values of the final temperature code signal Tcode[0:7] is adjusted according to the y-intercept of a straight characteristic line of the target temperature code values. To adjust the y-intercept, the final temperature code signal generator 424 generates a second count signal cnt2 by counting pulses of the reference clock signal OSC2, beginning with an initial count value init[0:7], during the activation period of the comparison signal cmp, and outputs the second count signal cnt2 as the final temperature code signal Tcode[0:7]. Or, the final temperature code signal generator 424 adds or subtracts the value of an offset signal OS[0:7] that indicates a difference between the value of the final temperature code signal Tcode[0:7] and the target temperature code value to or from the second count signal cnt2 to modify the final temperature code signal Tcode[0:7].

Figure 2:
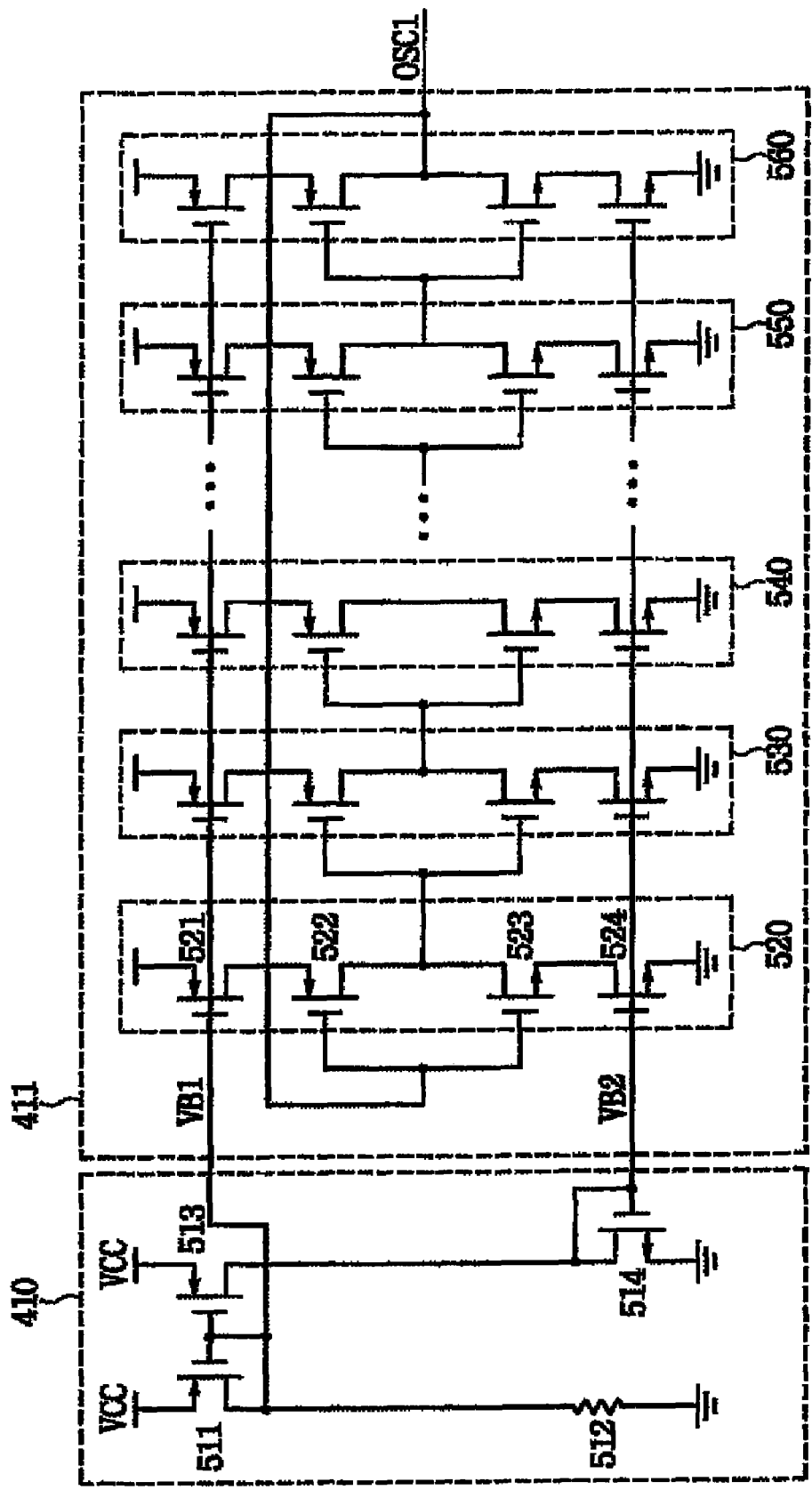
FIG. 2 is a circuit diagram of a first bias unit and a first ring oscillator of FIG. 1, according to exemplary embodiments.

FIG. 2 is a circuit diagram of the first bias unit 410 and the first ring oscillator 411 of the temperature sensing circuit of a semiconductor device, according to exemplary embodiments.

The first bias unit 410 includes a p-channel metal oxide semiconductor (PMOS) transistor 511 and a resistor 512 connected between a power supply voltage Vcc and a ground voltage Vss. The first bias unit 410 further includes a PMOS transistor 513 and an n-channel metal oxide semiconductor (NMOS) transistor 514. The PMOS transistors 511 and 513 constitute a current mirror.

The gate and drain of the NMOS transistor 514 are connected to each other. The first bias signal VB1, which is a first output voltage of the first bias unit 410, is applied to the gates of the PMOS transistors 511 and 513. The second bias signal VB2, which is a second output voltage of the first bias unit 410, is applied to the gate of the NMOS transistor 514.

The first ring oscillator 411 includes a multiple delay stages 520, 530, 540, . . . , 550 and 560 connected in series. For example, referring to the first delay stage 520 for purposes of illustration, the first delay stage 520 includes PMOS transistors 521 and 522 and NMOS transistors 523 and 524 connected in series between the power supply voltage Vcc and the ground voltage Vss. Here, the PMOS transistor 521 operates in response to the first bias signal VB1, and the NMOS transistor 524 operates in response to the second bias signal VB2. The PMOS transistor 522 and the NMOS transistor 523 operate in response to the fed-back first clock signal OSC1. It is understood that the delay stages 530, 540, 550 and 560 may be configured substantially the same as discussed above with respect to the first delay stage 520.

The PMOS transistors 521 of the delay stages 520, 530, 540, 550 and 560 operating in response to the first bias signal VB1 constitute a current mirror together with the PMOS transistors 511 and 513 of the first bias unit 410. Likewise, the NMOS transistors 524 of the delay stages 520, 530, 540, 550 and 560 operating in response to the second bias signal VB2 constitute a current mirror together with the NMOS transistor 514 of the first bias unit 410.

Operations of the first bias unit 410 and the first ring oscillator 411 are described below with reference to FIG. 2.

The first bias unit 410 outputs the first and second bias signals VB1 and VB2, which vary according to changes in temperature, to the first ring oscillator 411, thereby changing the period of the first clock signal OSC1. More specifically, when temperature increases, the resistance of the resistor 512 increases, current flowing through the PMOS transistor 511 is reduced, and the voltage level of the first bias signal VB1 rises. Thus, current flowing through the NMOS transistor 514 and current flowing through the PMOS transistor 513 are reduced, and the voltage level of the second bias signal VB2 drops.

Also, since the voltage level of the first bias signal VB1 rises and the voltage level of the second bias signal VB2 drops, currents flowing through the respective delay stages 520, 530, 540, 550 and 560 of the first ring oscillators 411 are reduced, and so are currents flowing through the NMOS transistors 524. When the currents flowing through the delay stages 520, 530, 540, 550 and 560 are reduced, the driving capabilities of the delay stages 520, 530, 540, 550 and 560 deteriorate, and thus the delays of the delay stages 520, 530, 540, 550 and 560 increase. In other words, an interval between points in time at which the first clock signal OSC1 is toggled increases, and the period of the first clock signal OSC1 lengthens.

In comparison, when temperature drops, the resistance of the resistor 512 decreases, the current flowing through the PMOS transistor 511 increases, and the voltage level of the first bias signal VB1 drops. In response to the first bias signal VB1, the currents flowing through the PMOS transistor 513 and the current flowing the NMOS transistor 514 increase, and the voltage level of the second bias signal VB2 rises.

Also, since the voltage level of the first bias signal VB1 drops, and the voltage level of the second bias signal VB2 rises, the currents flowing through the PMOS transistors 521 of the respective delay stages 520, 530, 540, 550 and 560 increase, and so do the currents flowing through the NMOS transistors 524. Thus, the driving capabilities of the delay stages 520, 530, 540, 550 and 560 are improved, and the delays of the delay stages 520, 530, 540, 550 and 560 decrease. In other words, the period of the first clock signal OSC1 shortens.

As described above, the first ring oscillator 411 generates the first clock signal OSC1 using the first bias signal VB1 and the second bias signal VB2 whose voltage levels vary in different directions according to changes in temperature. In the depicted embodiment, the first ring oscillator 411 lengthens the period of the first clock signal OSC1 when temperature rises, and shortens the period when temperature drops.

Figure 3:
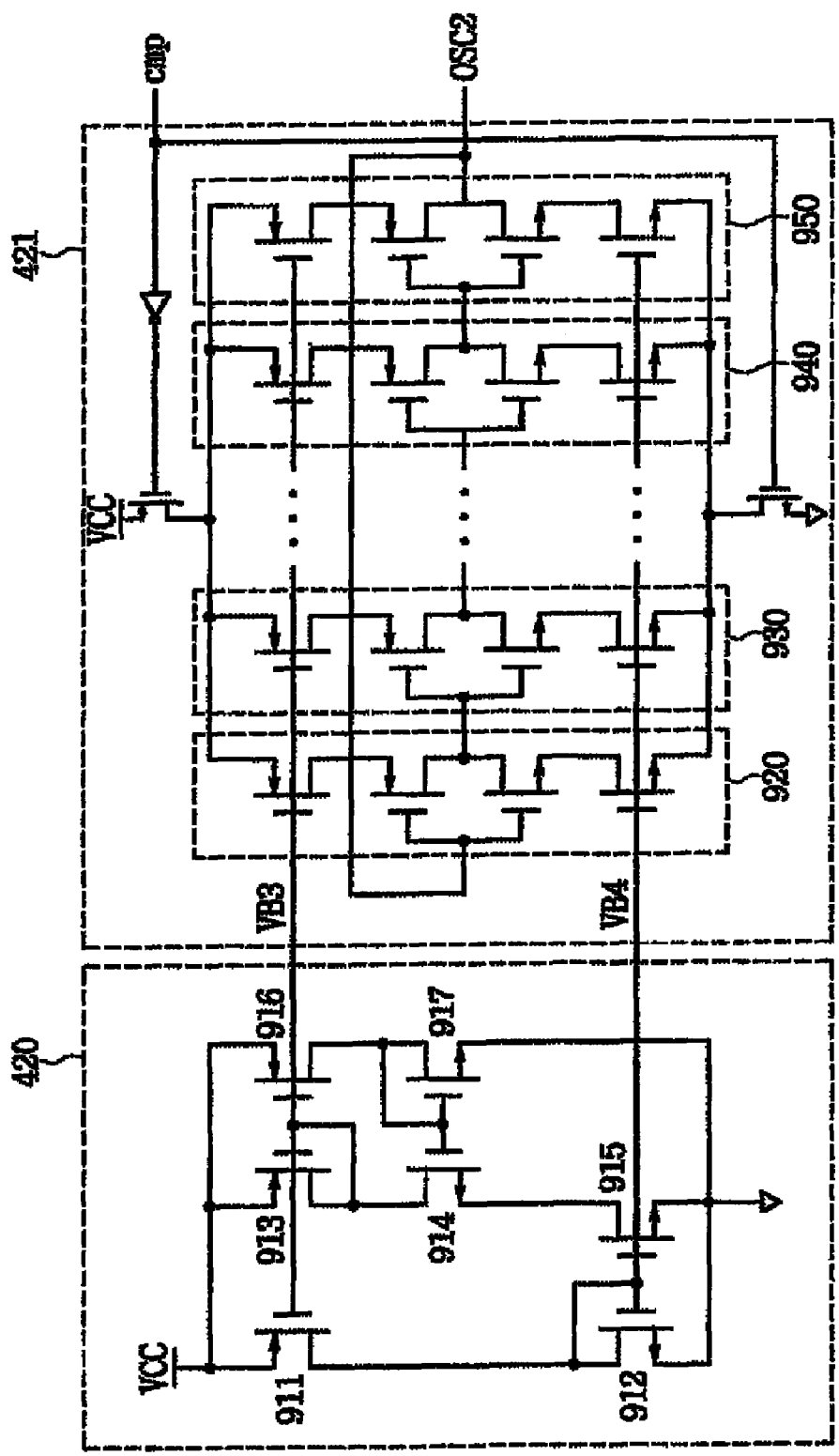
FIG. 3 a circuit diagram of a second bias unit and a second ring oscillator of FIG. 1, according to exemplary embodiments.

FIG. 3 a circuit diagram of the second bias unit 420 and the second ring oscillator 421 in the temperature sensing circuit of a semiconductor device, according to exemplary embodiments.

The second bias unit 420 includes a PMOS transistor 911 and an NMOS transistor 912 connected in series between the power supply voltage Vcc and the ground voltage Vss. The second bias unit 420 further includes a PMOS transistor 913 and NMOS transistors 914 and 915 connected in series between the power supply voltage Vcc and the ground voltage Vss. The PMOS transistors 911, 913 and 916 constitute a current mirror. Likewise, the NMOS transistors 912 and 915 and the NMOS transistors 914 and 917 form current mirrors. Here, the voltage of the gates of the PMOS transistors 911, 913 and 916 is output as the third bias signal VB3, and the voltage of the gates of the NMOS transistors 912 and 915 is output as the fourth bias signal VB4.

The second ring oscillator 421 includes multiple delay stages 920, 930, . . . , 940 and 950 connected in series. The delay stages 920, 930, 940 and 950 of the second ring oscillator 421 are configured substantially the same as those of the first ring oscillator 411, described above with reference to FIG. 2.

Operations of the second bias unit 420 and the second ring oscillator 421 are described below with reference to FIG. 3.

The second bias unit 420 has uniform internal current regardless of changes in temperature, and thus the voltage levels of the third bias signal VB3 and the fourth bias signal VB4 do not vary according to temperature. Also, since the respective delay stages 920, 930, 940 and 950 of the second ring oscillator 421 maintain uniform driving capabilities in response to the third and fourth bias signals VB3 and VB4 kept at uniform levels, the delays of the respective delay stages 920, 930, 940 and 950 also are kept uniform.

However, the second ring oscillator 421 receives the power supply voltage Vcc and the ground voltage Vss and operates only when the comparison signal cmp is activated to a high level. Thus, as described above, the second ring oscillator 421 oscillates the reference clock signal OSC2, which has a uniform period regardless of changes in temperature, during an activation period of the comparison signal cmp.

Figure 4:
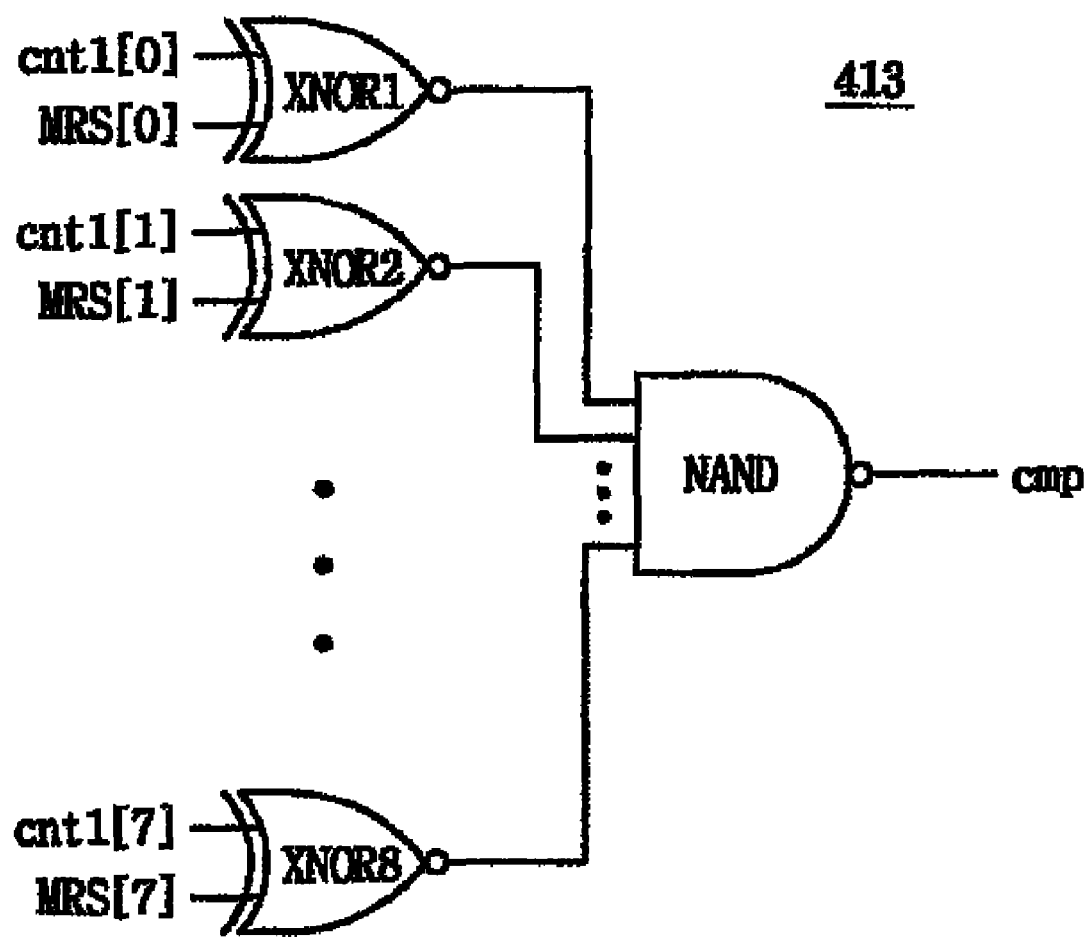
FIG. 4 is a circuit diagram of a comparator of FIG. 1, according to exemplary embodiments.

FIG. 4 is a circuit diagram of the comparator 413 in the temperature sensing circuit of a semiconductor device, according to exemplary embodiments. The comparator 413 includes first to eighth exclusive non-disjunction gates XOR1 to XOR8 and a non-conjunction gate NAND.

Operation of the comparator 413 is described below with reference to FIG. 4.

The first to eighth exclusive non-disjunction gates XOR1 to XOR8 receive the first count signal cnt1[0:7] and mode register set signal MRS[0:7], and perform exclusive non-disjunction operations. For example, when the first bit of the first count signal cnt1[0] and the mode register set signal MRS[0] are both at high levels or both at low levels, the first exclusive non-disjunction gate XOR1 outputs a high-level signal. In other words, each of the first to eighth exclusive non-disjunction gates XOR1 to XOR8 outputs a high-level signal only when the corresponding bits of the first count signal cnt1[0:7] and the mode register set signal MRS[0:7] have the same voltage level.

The non-conjunction gate NAND receives the output signals of the first to eighth exclusive non-disjunction gates XOR1 to XOR8, performs a non-conjunction operation on the signals, and outputs the comparison signal cmp. The non-conjunction gate NAND inactivates the comparison signal cmp to a low level only when all the output signals of the first to eighth exclusive non-disjunction gates XOR1 to XOR8 are at high levels. In other words, the non-conjunction gate NAND outputs the comparison signal cmp activated to a high level when the value of the first count signal cnt1[0:7] is not the same as the value of the mode register set signal MRS[0:7], and outputs the comparison signal cmp inactivated to a low level when the value of the first count signal cnt1[0:7] is the same as the value of the mode register set signal MRS[0:7].

As described above, according to exemplary embodiments, the comparator 413 outputs the comparison signal cmp activated to a high level when the value of the first count signal cnt1[0:7] is less than the value of the mode register set signal MRS[0:7]. The comparator 413 outputs the comparison signal cmp inactivated to a low level when the value of the first count signal cnt1[0:7] becomes the same as the value of the mode register set signal MRS[0:7].

Figure 5:
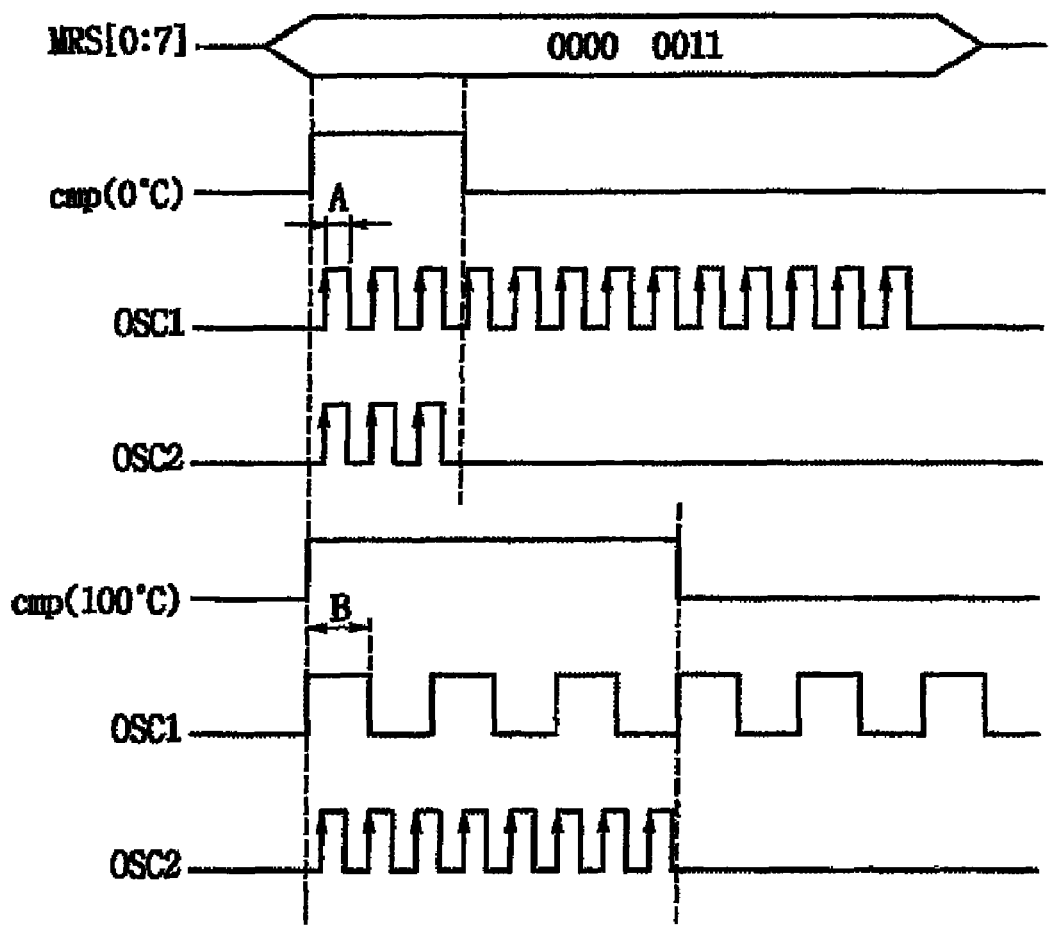
FIG. 5 is a waveform diagram of output signals of the first and second ring oscillators of FIG. 1 according to a change in temperature, according to exemplary embodiments.

FIG. 5 is a timing diagram of output waveforms of the first and second ring oscillators 411 and 421, according to changes in temperature in the temperature sensing circuit of a semiconductor device, according to exemplary embodiments. In the depicted example, FIG. 5 shows the first clock signal OSC1 of the first ring oscillator 411 and the reference clock signal OSC2 of the second ring oscillator 421 when the temperature is 0° C. and 100° C.

Referring to FIG. 5, pulse width B of the first clock signal OSC1 when the temperature is 100° C. is larger than pulse width A of the first clock signal OSC1 when the temperature is 0° C. In other words, the higher the temperature, the longer the period of the first clock signal OSC1 becomes, and the lower the temperature, the shorter the period of the first clock signal OSC1 becomes. Assuming that the mode register set signal MRS[0:7] have a value of "00000011," or "3" in decimal notation, for example, the comparison signal cmp is kept active until the number of pulses of the first clock signal OSC1 becomes 3, and then inactivated. Here, because the pulse width of the first clock signal OSC1 when the temperature is 0° C. is different from that when the temperature is 100° C., the activation period of the comparison signal amp varies according to temperature. Because the reference clock signal OSC2 has a uniform pulse width, while the comparison signal cmp varies according to temperature, the number of pulses of the reference clock signal OSC2 generated during the activation period of the comparison signal cmp likewise varies according to temperature.

Figure 6A:
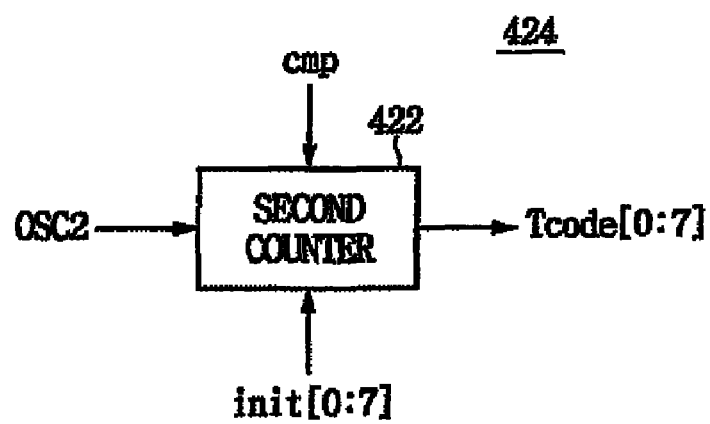
FIG. 6A is a block diagram of a final temperature code signal generator of FIG. 1, according to a first exemplary embodiment.
Figure 6B:
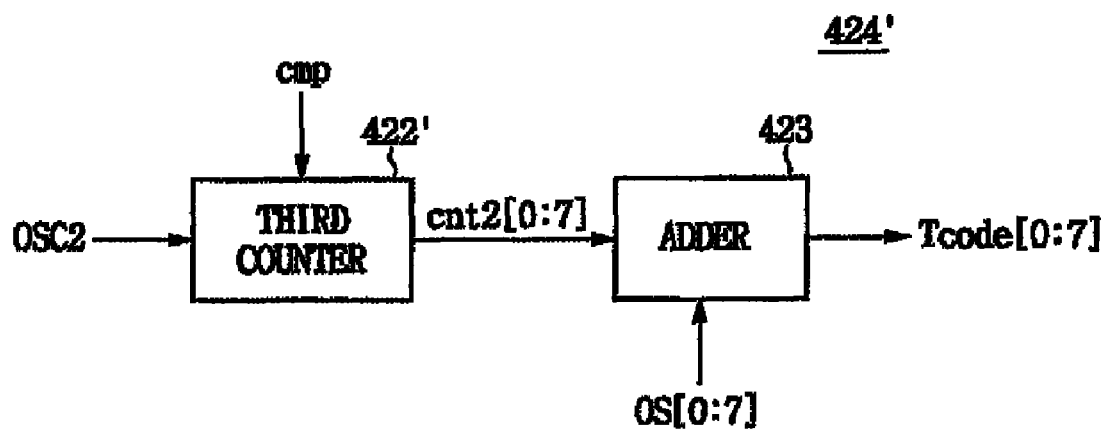
FIG. 6B is a block diagram of the final temperature code signal generator of FIG. 1, according to a second exemplary embodiment.

FIGS. 6A and 6B are block diagrams of the final temperature code signal generator 424 in the temperature sensing circuit of a semiconductor device, according to exemplary embodiments. FIG. 6A illustrates the final temperature code signal generator 424 including a second counter 422 alone, according to a first exemplary embodiment, and FIG. 6B illustrates a final temperature code signal generator 424' including a third counter 422' and an adder 423, according to a second exemplary embodiment.

Operation of the final temperature code signal generator 424 is described below with reference to FIGS. 6A and 6B.

Referring to FIG. 6A, to adjust the y-intercept of a straight characteristic line of values of the final temperature code signal Tcode[0:7], the second counter 422 receives the reference clock signal OSC2, counts pulses of the reference clock signal OSC2 beginning with the initial count value init[0:7], and outputs the second count signal cnt2[0:7] as the final temperature code signal Tcode[0:7] in the activation period of the comparison signal cmp. Here, the second count signal cnt2[0:7] is generated inside the second counter 422 of FIG. 6A and thus not shown in the drawing.

Referring to FIG. 6B, the third counter 422' receives the reference clock signal OSC2, counts pulses of the reference clock signal OSC2, and outputs the second count signal cnt2[0:7] in the activation period of the comparison signal cmp. The adder 423 receives the second count signal cnt2[0:7], and adjusts the value of the final temperature code signal Tcode[0:7] by adding or subtracting the value of the offset signal OS[0:7] to or from the value of the second count signal cnt2[0:7] to adjust the y-intercept of a straight characteristic line of values of the final temperature code signal Tcode[0:7].

Figure 7:
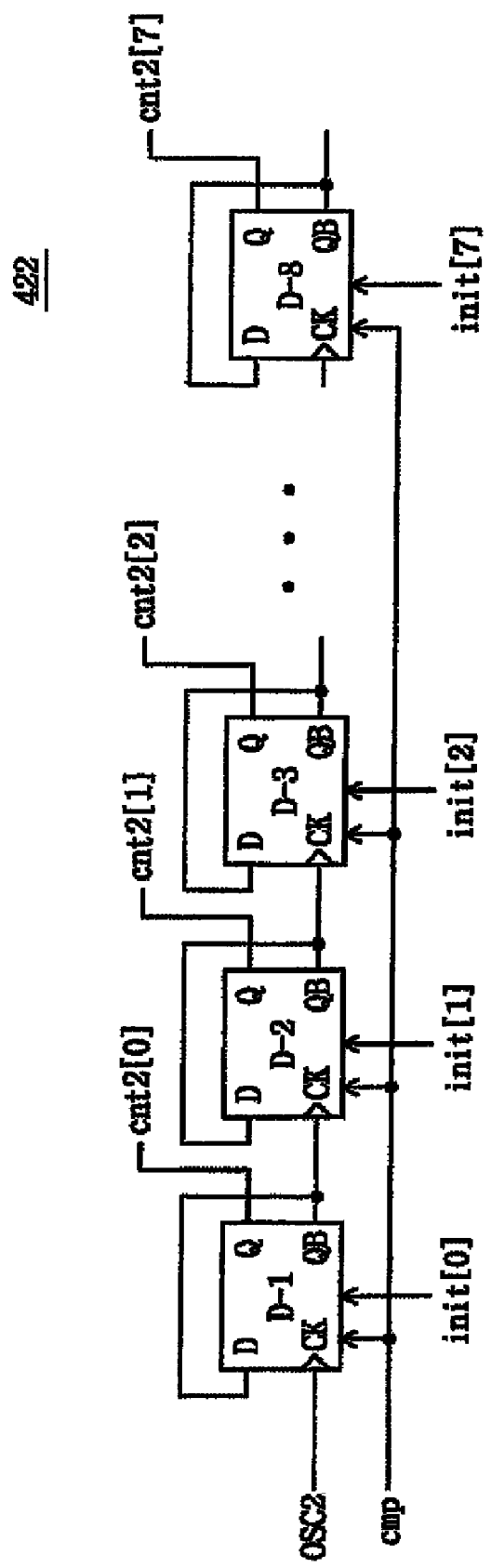
FIG. 7 is a circuit diagram of a second counter of FIG. 6A, according to exemplary embodiments.

FIG. 7 is a circuit diagram of the second counter 422 in the temperature sensing circuit of a semiconductor device, according to exemplary embodiments. The second counter 422 includes first to eighth D flip-flops D-1 to D-8.

Operation of the second counter 422 is described below with reference to FIG. 7.

The first D flip-flop D-1 outputs the first bit of the second count signal cnt2[0] obtained by dividing the frequency of the reference clock signal OSC2 by two in response to the reference clock signal OSC2 input through a clock terminal CK during the activation period of the comparison signal cmp. The second D flip-flop D-2 outputs the second bit of the second count signal cnt2[1] obtained by dividing the frequency of the first bit of the second count signal cnt2[0] by two in response to an inverse signal of the first bit of the second count signal cnt2[0] input through a clock terminal CK during the activation period of the comparison signal cmp. In this manner, the third to eighth D flip-flops D-3 to D-8 respectively output the third to eighth bits of the second count signal cnt2[2] to cnt2[7] obtained by dividing the frequencies of the second to seventh bits of the second count signal cnt2[1] to cnt2[6] by two in response to inverse signals of the second to seventh bits of the input second count signal cnt2[1] to cnt2[6] during the activation period of the comparison signal cmp. Thus, the second counter 422 increases the second count signal cnt2[0:7] one by one, beginning with the initial count value init[0:7] "0."

The configuration and operation of the third counter 422' in the final temperature code signal generator 424' are substantially the same as those of the second counter 422 in the final temperature code signal generator 424, except that the first clock signal OSC1 is applied to the clock terminal CK of the first D flip-flop D-1, and counting begins with the initial count value init[0:7] "0." Thus, the description will not be repeated with reference to the third counter 422'.

Figure 8:
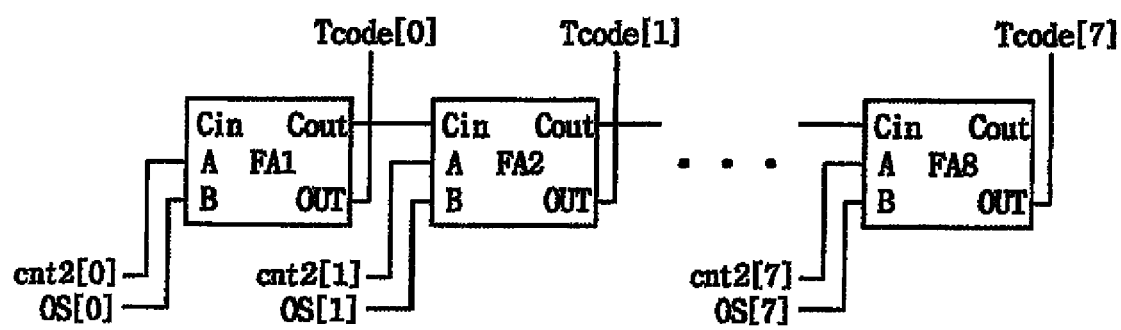
FIG. 8 is a circuit diagram of an adder of FIG. 6B, according to exemplary embodiments.

FIG. 8 is a circuit diagram of the adder 423 in the temperature sensing circuit of a semiconductor device, according to exemplary embodiments. The adder 423 includes first to eighth full adders FA1 to FA8.

Operation of the adder 423 is described below with reference to FIG. 8.

The first full adder FA1 adds or subtracts the first bit of the offset signal OS[0] to or from the second count signal bit cnt2[0], outputs the first bit of the final temperature code signal Tcode[0] through an output terminal OUT, and outputs a carry signal from a carry output terminal Cout. Similarly, the second to eighth full adders FA2 to FA8 respectively add or subtract the second to eighth bits of the offset signal OS[1] to OS[7] to or from the second to eighth bits of the second count signal cnt2[1] to cnt2[7], output the second to eighth bits of the final temperature code signal Tcode[1] to Tcode[7] through corresponding output terminals OUT. The second to seventh full adders FA2 to FA7 also respectively output carry signals from corresponding carry output terminals Cout.

As described above, the adder 423 in the temperature sensing circuit of a semiconductor device according to exemplary embodiments receives the second count signal cnt2[0:7] and the offset signal OS[0:7], adds or subtracts the offset signal OS[0:7] to or from the second count signal cnt2[0:7], and outputs the final temperature code signal Tcode[0:7].

Figure 9:
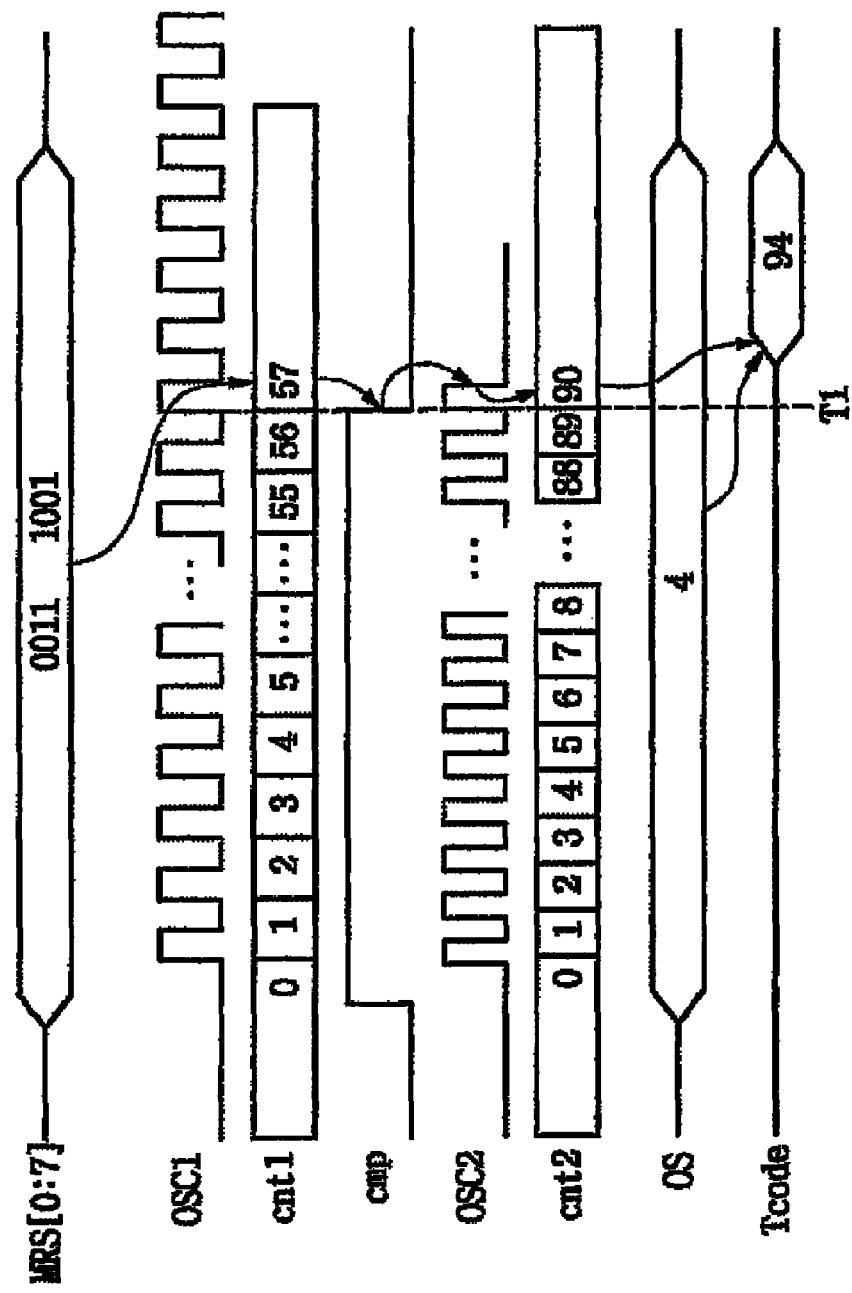
FIG. 9 is an operation timing diagram of a temperature sensing circuit of a semiconductor device, according to exemplary embodiments.

FIG. 9 is an operation timing diagram of a temperature sensing circuit of a semiconductor device, according to exemplary embodiments, in which the first clock signal OSC1, the first count signal cnt1, the mode register set signal MRS[0:7], the comparison signal cmp, the reference clock signal OSC2, the second count signal cnt2, the offset signal OS, and the final temperature code signal Tcode are shown.

In the depicted example, the mode register set signal MRS[0:7] loads a value "0011 1001," equal to the value of the first count signal cnt1 required to adjust the slope of a straight characteristic line of temperature code values until the variation range of measured temperature code values becomes the same as the variation range of target temperature code values, e.g., required by specification.

As described with reference to FIG. 2, for example, the first clock signal OSC1 is output in the form of a pulse having a period varying according to changes in temperature. As described with reference to FIGS. 6A and 6B, the first count signal cnt1 is obtained by counting pulses of the first clock signal OSC1. The value of the first count signal cnt1 is fixed at a point in time at which the value of the first count signal cnt1 becomes "0011 1001," the value of the mode register set signal MRS[0:7].

The comparison signal cmp is activated to a high level during the period in which the value of the first count signal cnt1 is less than the value of the mode register set signal MRS[0:7]. The comparison signal cmp is inactivated to a low level at a point in time T1 at which the value of the first count signal cnt1 becomes the same as the value of the mode register set signal MRS[0:7], and is then maintained at the low level.

The reference clock signal OSC2 is output in the form of a pulse having a uniform period, regardless of a change in temperature. The reference clock signal OSC2 stops toggling when the comparison signal cmp is inactivated to a low level.

The second count signal cnt2 is obtained by counting pulses of the second clock signal OSC2. The value of the second count signal cnt2 is fixed at a point in time at which the reference clock signal OSC2 stops toggling.

The offset signal OS is set to "4," for example, which is the difference between the y-intercept of a straight characteristic line of values of the final temperature code signal Tcode[0:7] and the y-intercept of a straight characteristic line of values of the target temperature code required by specification. The final temperature code signal Tcode is output as a value "94," obtained by adding the value "4" of the offset signal OS to the final value "90" of the second count signal cnt2.

Figure 10:
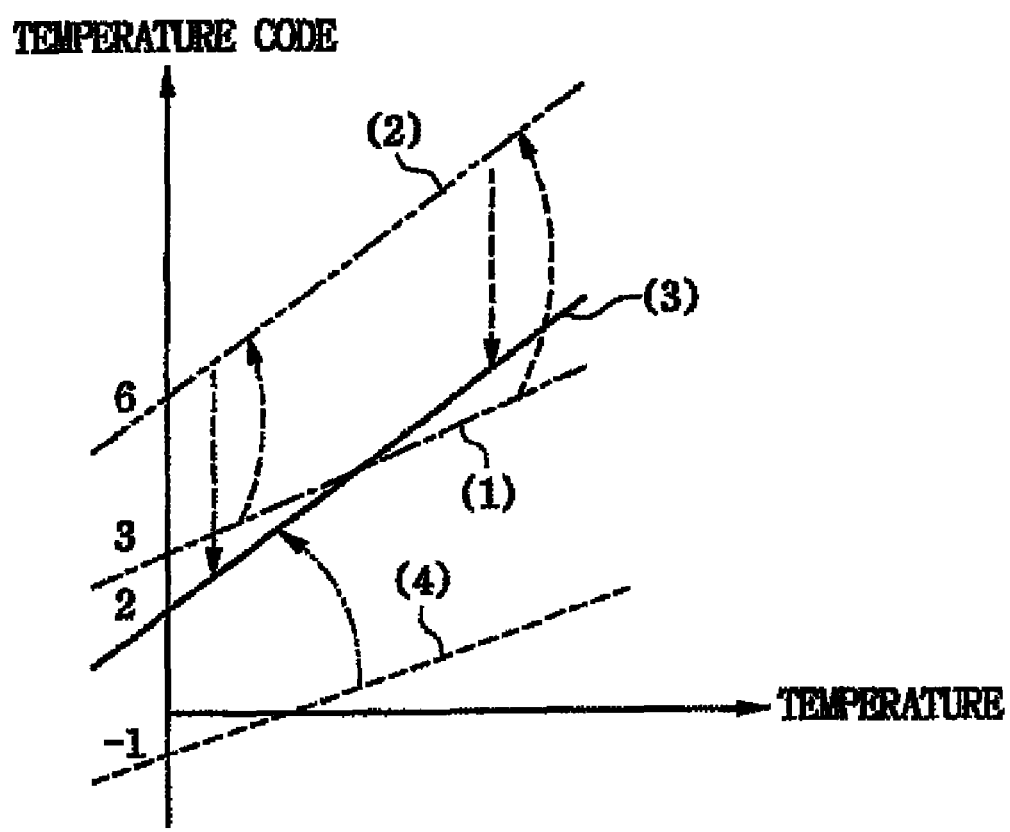
FIG. 10 is a simulation result graph showing a change in temperature code with respect to a change in temperature of a semiconductor device, according to exemplary embodiments.

FIG. 10 is a simulation result graph showing a change in temperature code with respect to a change in temperature of a semiconductor device, according to exemplary embodiments. In the graph, the x-axis indicates temperature, and the y-axis indicates temperature code value. In other words, the slopes of first to fourth straight characteristic lines (1) to (4) denote variations of temperature code values with respect to changes in temperature.

The first to fourth straight characteristic lines (1) to (4) are described below with reference to FIG. 10.

The first straight characteristic line (1) denotes the variation range of values of the final temperature code signal Tcode[0:7] with respect to a change in temperature, and the third straight characteristic line (3) denotes the variation range of target temperature code values required by specification, for example. The second straight characteristic line (2) is obtained by modifying the slope of the first straight characteristic line (1) to adjust the first straight characteristic line (1) according to the third straight characteristic line (3). The fourth straight characteristic line (4) is obtained by modifying the y-intercept of the first straight characteristic line (1) to adjust the first straight characteristic line (1) according to the third straight characteristic line (3).

For example, it is assumed for purposes of discussion that the slope of the first straight characteristic line (1) with respect to the variation range of measured temperature code values is 2, and the y-intercept of the first straight characteristic line (1) is 3. It is further assumed that the slope of the third straight characteristic line (3) is 4, and the y-intercept of the third straight characteristic line (3) is 2.

Initially, the slope of the first straight characteristic line (1) is less than that of the third straight characteristic line (3). The slope of the first straight characteristic line (1) is thus increased from 2 to 4 to generate the second straight characteristic line (2) having a slope of 4. When the slope of the first straight characteristic line (1) doubles from 2 to 4, the y-intercept also doubles from 3 to 6. Then, the y-intercept of the second straight characteristic line (2) becomes higher than that of the third straight characteristic line (3) by 4, and thus is reduced by the offset value of 4 in accordance with the y-intercept of the third straight characteristic line (3).

Operation of the temperature sensing circuit of a semiconductor device, according to exemplary embodiments, is described below with reference to FIGS. 1 to 10.

First, it is assumed for purposes of discussion that a high temperature is set to 100° C., a low temperature is set to 0° C., and the final temperature code signal Tcode[0:7] consists of 8 bits.

To adjust the straight characteristic line of values of the final temperature code signal Tcode[0:7] according to the straight characteristic line of target temperature code values suggested by a specification, the slope and y-intercept of the straight characteristic line of values of the final temperature code signal Tcode[0:7] should be adjusted.

A method of adjusting the slope of the first straight characteristic line (1) of values of the final temperature code signal Tcode[0:7] is described below.

When the period of the first clock signal OSC1 generated by the first ring oscillator 411 increases with a rise in temperature, an interval between the first clock signal OSC1 increases. Thus, the increase rate of the first count signal cnt1[0:7] generated by the first counter 412 decreases while the same number of pulses are counted. Then, the activation period of the comparison signal cmp lengthens, and the value of the second count signal cnt2[0:7] increases in proportion to the length of the activation period of the comparison signal cmp. In other words, until the value of the first count signal cnt1[0:7] becomes the same as the value of the mode register set signal MRS[0:7], the first counter 412 keeps counting pulses of the first clock signal OSC1, and thus the value of the first count signal cnt1[0:7] is changed. Then, the activation period of the comparison signal cmp is changed, and so is the value of the second count signal cnt2[0:7] of the second counter 422.

For example, assuming that the slope of the first straight characteristic line (1) is 2 and the y-intercept is 3 (e.g., as shown in FIG. 10), and that the slope of the third straight characteristic line (3) of the target temperature code values, e.g., suggested by the specification is 4 and the y-intercept is 2, values of the second count signal cnt2[0:7] and the first count signal cnt1[0:7] required to increase the slope from 2 to 4 are set to "90" and "57" (e.g., as shown in FIG. 9), respectively.

First, to count the value of the first count signal cnt1[0:7] to 57, the value of the mode register set signal MRS[0:7] is set to "0011 1001." The first bias unit 410 outputs the first and second bias signals VB1 and VB2 corresponding to the current temperature, and the first ring oscillator 411 oscillates the first clock signal OSC1 in response to the first and second bias signals VB1 and VB2. The first counter 412 counts pulses of the oscillated first clock signal OSC1 and outputs the first count signal cnt1[0:7] having multiple bits.

The comparator 413 receives the first count signal cnt1[0:7] and the mode register set signal MRS[0:7], determines whether the respective bits of the first count signal cnt1[0:7] are the same as the corresponding bits of the mode register set signal MRS[0:7], and outputs the resulting comparison signal cmp. The comparison signal cmp is activated to a high level when the value of the first count signal cnt1[0:7] is not the same as the value of the mode register set signal MRS[0:7], and is inactivated to a low level when the value of the first count signal cnt1[0:7] becomes the same as the value of the mode register set signal MRS[0:7].

Meanwhile, the second bias unit 420 outputs the third and fourth bias signals VB3 and VB4 corresponding to the current temperature, and the second ring oscillator 421 oscillates the reference clock signal OSC2 in response to the third and fourth bias signals VB3 and VB4. The second ring oscillator 421 oscillates the reference clock signal OSC2 during the activation period of the comparison signal cmp. Thus, as the activation period of the comparison signal cmp lengthens, the number of pulses of the oscillated reference clock signal OSC2 increases.

The second counter 422 counts pulses of the oscillated reference clock signal OSC2 and outputs the second count signal cnt2[0:7] having multiple bits. The second counter 422 performs the counting operation during the activation period of the comparison signal amp, and maintains the value of the second count signal cnt2[0:7] obtained at a point in time at which the activation period of the comparison signal cmp ends.

When it is not necessary to adjust the y-intercept of the first straight characteristic line (1), the adder 413 receives the value of the second count signal cnt2, adds or subtracts the value "0" of the offset signal OS[0:7] to or from the value of the second count signal cnt2[0:7], and finally outputs the value of the second count signal cnt2[0:7] as the final temperature code signal Tcode[0:7].

When the slope of the first straight characteristic line (1) of the values of the output final temperature code signal Tcode [0:7] is less than the slope of the third straight characteristic line (3), the slope of the first straight characteristic line (1) must be increased. Thus, the value of the mode register set signal MRS[0:7] is set to an increased value.

The first bias unit 410, which has an internal current that decreases with an increase in temperature, outputs the first and second bias signals VB1 and VB2. The first ring oscillator 411 outputs the first clock signal OSC1, which has a delay that increases because currents flowing through the respective delay stages 520, 530, 540, 550 and 560 are reduced.

When the first counter 412 counts pulses of the input first clock signal OSC1 and outputs the delayed first count signal cnt1[0:7], the point in time at which the first count signal cnt1[0:7] becomes the same as the mode register set signal MRS[0:7] is delayed, and the activation period of the comparison signal cmp lengthens.

Meanwhile, the second bias unit 420 has a uniform internal current regardless of changes in temperature. Thus, the third and fourth bias signals VB3 and VB4 have uniform voltage levels, and the second ring oscillator 421 oscillates the reference clock signal OCS2, having a uniform period regardless of changes in temperature, in response to the third and fourth bias signals VB3 and VB4.

However, because the second ring oscillator 421 keeps oscillating the reference clock signal OSC2 during the lengthened activation period of the comparison signal cmp, the value of the second count signal cnt2[0:7] increases, and so does the slope of the first straight characteristic line (1).

When the slope of the first straight characteristic line (1) of the values of the output final temperature code signal Tcode [0:7] is greater than the slope of the third straight characteristic line (3) of target temperature code values, the slope of the first straight characteristic line (1) must be reduced. Thus, the value of the mode register set signal MRS[0:7] is set to a reduced value.

The first bias unit 410, which has an internal current that increases with a decrease in temperature, outputs the first and second bias signals VB1 and VB2. The first ring oscillator 411 outputs the first clock signal OSC1, which has a delay that decreases because the currents flowing through the respective delay stages 520, 530, 540, 550 and 560 increases.

The first counter 412 counts pulses of the first clock signal OSC1 and outputs the first count signal cnt1[0:7]. The comparator 413 compares the first count signal cnt1[0:7] with the mode register set signal MRS[0:7], and shortens the activation period of the comparison signal cmp.

Meanwhile, since the second ring oscillator 421 oscillates the reference clock signal OCS2 in the shortened activation period of the comparison signal cmp, the value of the second count signal cnt2[0:7] decreases, and the slope of the first straight characteristic line (1) is reduced.

As described above, the temperature sensing circuit of a semiconductor device according to an exemplary embodiment adjusts the activation period of the comparison signal cmp using the value of the mode register set signal MRS[0:7], thereby changing the value of the second count signal cnt2 [0:7] according to a change in temperature to change the slope of the first straight characteristic line (1). Consequently, a variation of values of the final temperature code signal Tcode [0:7] with respect to a change in temperature becomes the same as a variation of the target temperature code values with respect to a change in temperature suggested in a specification.

Next, a method of adjusting the y-intercept of the first straight characteristic line (1) is described below.

Two methods of adjusting the y-intercept of the first straight characteristic line (1) are described below with reference to FIGS. 6A and 6B, respectively.

Referring to FIG. 6A, the initial count value init[0:7] with which the second counter 422 begins a counting operation may be set to a predetermined negative value instead of "0," such that the y-intercept of the first straight characteristic line (1) can be the same as the y-intercept of the third straight characteristic line (3) at a point in time at which the second counter 422 finishes the counting operation.

As discussed above with reference to FIG. 10, it may be assumed that the slope of the first straight characteristic line (1) is 2 and the y-intercept is 3, and that the slope of the third straight characteristic line (3) is 4 and the y-intercept is 2. Here, the value of the second count signal cnt2[0:7] and the first count signal cnt1[0:7] required to increase the slope from 2 to 4 are set to "90" and "57," respectively, and the value of the second count signal cnt2[0:7] required to increase the y-intercept from 2 to 3 is set to "30," for example.

Referring to FIG. 10, the fourth straight characteristic line (4) is generated. The fourth straight characteristic line (4) has a y-intercept adjusted in advance in consideration of the y-intercept value to be changed when the slope of the first straight characteristic line (1) is adjusted. The value of the first count signal cnt1[0:7] according to a change in temperature is adjusted using the mode register set signal MRS[0:7], thereby changing the value of the second count signal cnt2[0:7] to adjust the slope of the first straight characteristic line (1). While the slope of the first straight characteristic line (1) is adjusted, the y-intercept value is also changed, and the first straight characteristic line (1) of measured temperature codes becomes the same as the third straight characteristic line (3) suggested by the specification.

For example, when the count value of the second counter 422 required to turn the first straight characteristic line (1) into the second straight characteristic line (2) by increasing the slope of the first straight characteristic line (1) is "90," and the count value of the second counter 422 required to increase the y-intercept from 2 to 3 is "30," a negative value "−120" of the sum "120" of the count values is set as the initial count value init[0:7]. This reduces the y-intercept by 4, which is an offset in consideration of adjustment of the slope of the first straight characteristic line (1), and generates the fourth straight characteristic line (4). At this time, an offset value applied to the adder 423 is set to "0."

To increase the slope of the fourth straight characteristic line (4) from 2 to 4, the value of the first count signal cnt1[0:7] must be counted to "57," for example. Thus, the value of the mode register set value MRS[0:7] is set to "0011 1001," and pulses of the first clock signal OSC1 are counted until the first count signal cnt1[0:7] becomes the same as the mode register set signal MRS[0:7] to adjust the activation period of the comparison signal cmp. During the activation period of the comparison signal cmp, the second ring oscillator 421 increases the slope of the fourth straight characteristic line (4) from 2 to 4 by increasing or decreasing the value of the second count signal cnt2[0:7], thereby generating a line that is the same as the third straight characteristic line (3). Here, the initial count value init[0:7] is intended to adjust the y-intercept of the first straight characteristic line (1) in advance, such that the y-intercept of the first straight characteristic line (1) can become the same as the y-intercept of the third straight characteristic line (3) at the same time as the process of adjusting the slope of the first straight characteristic line (1) of the final temperature code signal Tcode[0:7] according to the slope of the third straight characteristic line (3) of the target temperature code values is finished. In other words, the initial count value init[0:7] is intended to move the variation range of the final temperature code signal Tcode[0:7] in advance to adjust a variation of values of the final temperature code signal Tcode[0:7] with respect to a change in temperature.

As described above, in the methods of adjusting the y-intercept of the first straight characteristic line (1) using the initial count value init[0:7], the initial value of the second count signal cnt2[0:7] is set to an increased value or reduced value in advance in consideration of the variation of the y-intercept to be increased or decreased when the slope of the first straight characteristic line (1) is adjusted.

Referring now to FIG. 6B, the second straight characteristic line (2) having an adjusted slope may be moved in parallel to increase or reduce the y-intercept of the second straight characteristic line (2) by an offset.

It is assumed that the slope of the first straight characteristic line (1) is 2 and the y-intercept of the first straight characteristic line (1) is 3, and that the slope of the third straight characteristic line (3) is 4 and the y-intercept of the third straight characteristic line (3) is 2.

First, as illustrated in FIGS. 1 to 9, the value of the first count signal cnt1[0:7] is increased or decreased until the value becomes the same as the value of the mode register set signal MRS[0:7], thereby changing the value of the second count signal cnt2[0:7] according to a change in temperature to adjust the slope of the first straight characteristic line (1). As illustrated in FIG. 10, the slope of the first straight characteristic line (1) is increased to 4 to generate the second straight characteristic line (2) having a slope of 4 and a y-intercept of 6.

Here, with the increase of the slope, the y-intercept also increases from 3 to 6. Thus, the adder 423 reduces the value of the second count signal cnt2[0:7] by 4, the value of the offset signal, which is the difference between the y-intercept of the second straight characteristic line (2) and the y-intercept of the third straight characteristic line (3), finally adjusting the first straight characteristic line (1) to be in accordance with the third straight characteristic line (3).

Meanwhile, the value of the offset signal OS[0:7] and the initial count value init[0:7] are intended to adjust the y-intercept of the first straight characteristic line (1) according to the y-intercept of the third straight characteristic line (3). However, the offset signal OS[0:7] is intended to move the variation range of the final temperature code signal Tcode[0:7] after a variation of the value of the final temperature code signal Tcode[0:7] with respect to a change in temperature is adjusted. The initial count value init[0:7] is intended to move the variation range of the final temperature code signal Tcode [0:7] before a variation of the value of the final temperature code signal Tcode[0:7] with respect to a change in temperature is adjusted.

As described above, the temperature sensing circuit of a semiconductor device, according to exemplary embodiments, adjusts the initial count value init[0:7] indicating a point in time at which pulses of the reference clock signal OSC2 begin to be counted, or adds or subtracts the value of the offset signal OS[0:7] to or from the second count signal cnt2[0:7] having pulses that are completely counted, thereby adjusting the y-intercept of the first straight characteristic line (1) of the values of the final temperature code signal Tcode [0:7]. Thus, the first straight characteristic line (1) is adjusted according to the third straight characteristic line (3).

Consequently, the temperature sensing circuit of a semiconductor device, according to exemplary embodiments, adjusts the straight characteristic line of the final temperature code signal Tcode[0:7] using the mode register set signal MRS[0:7]. Also, the temperature sensing circuit adjusts the initial count value init[0:7] for counting pulses of the reference clock signal OSC2, or adds or subtracts the value of the offset signal OS[0:7] to or from the second count signal cnt2[0:7] having pulses that are completely counted, thereby adjusting the y-intercept of the straight characteristic line of the final temperature code signal Tcode[0:7]. Thus, the variation range of values of the final temperature code signal Tcode[0:7] generated according to a change in temperature can be adjusted according to the variation range of target temperature code values, for example, required by specification.

As described above, due to the temperature sensing circuit of a semiconductor memory device, according to exemplary embodiments, temperature data of the semiconductor device is finely and linearly adjusted, such that accurate target temperature code values can be generated, and the performance of the semiconductor device can be improved.

The foregoing is illustrative of exemplary embodiments and is not to be construed as limiting thereof. In the claims, means-plus-function clauses are intended to cover the structures described herein as performing the recited function, and not only structural equivalents but also equivalent structures. While the present inventive concept has been described with reference to exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A temperature sensing circuit of a semiconductor device, comprising:
    a code signal generator configured to output a first count signal having an increase rate that varies according to a change in temperature;
    a comparator configured to receive the first count signal and a control signal, compare the first count signal with the control signal, and output a comparison signal;
    a reference clock generator configured to generate a reference clock having a uniform period regardless of the change in temperature during an activation period of the comparison signal; and
    a final temperature code signal generator configured to count pulses of the reference clock, generate a second count signal, modify the second count signal using an offset value, and output the modified second count signal as a final temperature code signal.

2. The temperature sensing circuit according to claim 1, wherein the code signal generator includes:
    a first bias unit configured to output first and second bias signals having voltage levels that vary according to the change in temperature;
    a first ring oscillator configured to output a first clock having a variable period in response to the first and second bias signals; and
    a first counter configured to count pulses of the first clock and output the first count signal.

3. The temperature sensing circuit according to claim 1, wherein the reference clock generator includes:
    a second bias unit configured to output third and fourth bias signals having uniform voltage levels regardless of the change in temperature; and
    a second ring oscillator configured to generate and output the reference clock in response to the third and fourth bias signals in the activation period of the comparison signal.

4. The temperature sensing circuit according to claim 1, wherein the final temperature code signal generator includes a second counter configured to count the pulses of the reference clock, generate the second count signal, and output the second count signal as the final temperature code signal, and
    wherein the offset value adjusts a variation range of the final temperature code signal.

5. The temperature sensing circuit according to claim 1, wherein the final temperature code signal generator includes:
    a third counter configured to count the pulses of the reference clock and output the second count signal for adjusting a variation of a value of the final temperature code signal with respect to the change in temperature according to a variation of a target temperature code value with respect to the change in temperature; and
    an adder configured to receive the second count signal, add or subtract the offset value to or from a value of the second count signal, and output the final temperature code signal, the offset value adjusting a variation range of the modified final temperature code signal to a variation range of the target temperature code value.

6. The temperature sensing circuit according to claim 5, wherein the adder moves the variation range of the modified final temperature code signal to the variation range of the target temperature code value by adding or subtracting the offset value to or from the value of the second count signal, the offset value being set to a difference between a y-intercept of a straight characteristic line of the modified final temperature code signal and a y-intercept of a straight characteristic line of the target temperature code value.

7. The temperature sensing circuit according to claim 1, wherein the pulses of the reference clock are counted until a value of the first count signal becomes the same as a value of the control signal to adjust the activation period of the comparison signal, change a value of the second count signal, and adjust a slope of a straight characteristic line of the final temperature code signal.

8. The temperature sensing circuit according to claim 1, wherein when a value of the first count signal is less than a value of the control signal, the comparison signal is activated to keep the reference clock oscillating in the activation period of the comparison signal and increase a value of the second count signal, and
    when the value of the first count signal becomes the same as the value of the control signal, the comparison signal is inactivated to stop the reference clock from oscillating, and the offset value is added or subtracted to or from the second count signal to output the modified second count signal as the final temperature code signal.

9. The temperature sensing circuit according to claim 1, wherein the control signal is set to an increased value to increase a variation of a value of the final temperature code signal with respect to the change in temperature when the variation of the value of the final temperature code signal with respect to the change in temperature is smaller than a variation of a target temperature code value with respect to the change in temperature, and
    wherein the control signal is set to a reduced value to reduce the variation of the value of the final temperature code signal with respect to the change in temperature when the variation of the value of the final temperature code signal with respect to the change in temperature is larger than the variation of the target temperature code value with respect to the change in temperature.

* * * * *